Patented Oct. 27, 1953

2,657,196

UNITED STATES PATENT OFFICE 2,657,196

PRODUCTION OF POLYAMINOTRIAZOLES

James Wotherspoon Fisher, Harold Bates, and Edward William Wheatley, Spondon, near Derby, England, assignors to British Celanese Limited, a corporation of Great Britain No Drawing. Application June 28, 1950, Serial No. 170,956. In Great Britain July 7, 1949

4 Claims. (Cl. 260—78.4)

This invention relates to improvements in the production of polymers.

U. S. Patent No. 2,512,667 describes the production of nitrogen-containing polymers from dihydrazides of dicarboxylic acids in presence of hydrazine, e. g. 10% by weight of the dihydrazide, over and above that combined in the dihydrazide and also describes using dicarboxylic esters with an amount of hydrazine in excess of two moles for each mole of dicarboxylic ester. U. S. Patent No. 2,512,600 describes the production of such polymers from hydrazine and the dicarboxylic acids themselves or their anhydrides, again using more than two moles of hydrazine.

Polymers may be produced according to the processes of the specifications which possess characteristics, including resistance to degenerative hydrolysis by boiling hydrochloric acid, indicating that they contain the 1.2.4-triazole nucleus repeated along the main polymer chain.

It appears that to produce such polymers which are resistant to degenerative hydrolysis by simple heating of dihydrazides or equivalent raw materials, a certain excess of hydrazine, combined or uncombined, over 2 moles to each mole of dicarboxylic acid is necessary. The actual amount which is required varies somewhat with the conditions of heating employed during the polymerisation. For example, to produce a polymer of high nitrogen content and high melting point similar to those described in U. S. Patent No. 2,512,667, a minimum of about 5% of free hydrazine on sebacic dihydrazide is necessary at 230° C., whilst a minimum of about 2.7% of free hydrazine on the sebacic dihydrazide is required at 190° C. However, polymers of somewhat lower melting point and lower nitrogen content but still resistant to hydrolysis by boiling hydrochloric acid may be produced using even smaller quantities of free hydrazine.

It has now been found that in any of the above processes polymers resistant to hydrolysis may likewise be produced using only 2 moles of hydrazine, combined or uncombined, to each mole of dicarboxylic acid, provided that the polymerisation is carried out in the presence of water vapour and/or provided that the liquid contents of the pressure vessel used for the polymerisation are sufficient to leave only a comparatively small vapour space above the reagents. Thus, for example, in the one case sebacic dihydrazide or equivalent dihydrazide may be heated with water in an autoclave and the pressure not released until the polymerisation is complete. This differs from the preferred procedure according to the prior specifications in which pressure release was allowed from time to time or continuously during the polymerisation. The amount of water may be from about 10% upwards on the weight of the hydrazide. A convenient quantity is about 20–75% of water on the weight of the dihydrazide. In the alternative procedure where the polymerisation is carried out under such conditions that there is only a small vapour space above the reagents, it is desirable to melt the dihydrazide into the autoclave, since generally these dihydrazides are very voluminous and, if the autoclave is charged with the solid dihydrazide, that solid on melting will occupy a comparatively small proportion of the total volume of the autoclave. To avoid this, the dihydrazide may be melted in a separate vessel under conditions excluding oxygen, and may then be run in the molten condition into the autoclave to be used for the polymerisation or cast into sticks or other convenient form which can be packed into the autoclave. By this means the autoclave can quite conveniently be filled to 60% or better up to 75% or 80% or more of its volume, leaving only 40–20% or less as the vapour space.

The new process of producing nitrogen-containing polymers may be applied when starting with dihydrazides or when starting with free hydrazine together with a dicarboxylic ester, a free dicarboxylic acid or a dicarboxylic acid anhydride.

The conditions of polymerisation are substantially the same as those described in the earlier specifications except that no release of pressure is permitted throughout the major part of the polymerisation. Generally we prefer polymerisation temperatures of the order of 190–260° C. The polymerisation is continued until a polymer resistant to hydrolysis by hydrochloric acid is obtained, and is preferably continued until the polymer has fibre-forming properties. The polymerisation may be continued beyond this to the point when resinification sets in, in which case subsequent hydrolysis, e. g. with acid or with water or steam as described in U. S. Patent No. 2,512,624 restores the linear character of the polymer.

The following examples illustrate the invention.

*Example 1*

50 parts by weight of sebacic dihydrazide and 24 parts by weight of water were charged into a stainless steel autoclave and heated for 2 hours at 220° C. The product was white and granular and melted at 220° C. It was almost insoluble in cold methanol but soluble on prolonged boiling. Its intrinsic viscosity was 0.36 and its nitrogen content about 24.2%. Hydrolysis of the polymer in boiling hydrochloric acid gave the usual oily hydrochloride and a very small quantity of hydrazine and free sebacic acid similar to the small amounts set free on hydrolysis of the polymers of the prior specifications.

*Example 2*

50 parts by weight of sebacic dihydrazide and 15 parts by weight of water were charged into an autoclave and heated for 3 hours at 220° C. Towards the end of this period the maximum pressure of 500 lbs. was reduced to 200 lbs. The polymer was infusible and had a nitrogen content of 24.3%. It was hydrolysed to give an oily polymeric hydrochloride, in which operation very small quantities of hydrazine and sebacic acid were set free, and the hydrochloride was neutralised and gave a fibre-forming polymer of intrinsic viscosity 0.51, melting point 192–195° C. and nitrogen content 22.2%. The polymer was soluble in methanol.

*Example 3*

50 parts by weight of sebacic acid were heated with exactly 2 moles of hydrazine in the form of a 55% aqueous solution in an autoclave first for 2 hours at 220° C., during which the maximum recorded pressure was 280 lbs. per square inch, the temperature then raised to 260° C. and maintained for a further hour at this temperature, during which the pressure recorded rose to 560 lbs. per square inch. The pressure was then released down to 400 lbs. per square inch during 20 minutes, and the temperature and pressure maintained at 260° C. and 400 lbs. per square inch respectively for a further hour. The amount of water originally present is approximately 20% of the combined weight of the two reagents.

The final polymer was a light-coloured tough material, melting point 175–180° C., capable of giving filaments from the melt, insoluble in water and acetone, soluble in hot methanol and in cresol and formic acid. Its intrinsic viscosity was 0.45 and nitrogen content 22.7%. On hydrolysis with hydrochloric acid only minute quantities of hydrazine and sebacic acid were liberated.

*Example 4*

Sebacic dihydrazide was melted and cast into cylindrical sticks of 0.2 inch diameter using an apparatus of the type described in U. S. Patent No. 2,485,772. The melting period was reduced to a minimum and the melting was carried out in nitrogen so as to reduce to a minimum decomposition and/or condensation of the hydrazide. The sticks of hydrazide were than charged into an autoclave having an internal diameter of 3.0 inches, the sticks being arranged with their length running with the length of the autoclave and being arranged so that the maximum quantity was charged into the autoclave. By this means about 83% of the total volume of the autoclave was taken up by the solid dihydrazide. The autoclave was then sealed and the contents heated for 3 hours at 220° C. The product had properties similar to those of the product of Example 1 and, as in that example, hydrolysis of the polymer in boiling hydrochloric acid gave an oily hydrochloride and a small quantity of hydrazine and free sebacic acid.

The results obtained in the above four examples are in marked contrast with the results which can be obtained by heating sebacic dihydrazide in the absence of water and under conditions such that there is a substantial free vapour space above the molten reagents. Sebacic dihydrazide as normally prepared is so voluminous that completely filling an autoclave with the solid results only in a charge which in the molten state occupies substantially less than 50% of the volume of the autoclave. (The packing density of the sebacic dihydrazide is not substantially increased by grinding.) For example, when an autoclave is charged with sebacic dihydrazide and the autoclave flushed out with nitrogen before sealing, and then after sealing the contents are heated at 210° C. for 2¾ hours and then for 1 hour also at 210° C. but under an absolute pressure of 5 mms. of mercury, and finally heated for 2½ hours at 230° C. also under an absolute pressure of 5 mms. of mercury, the product has a melting point of about 190–195° C. and a nitrogen content of about 23%. In these respects the properties are similar to those obtained in Example 2 above. However, on hydrolysing the polymer with boiling hydrochloric acid, the polymer is substantially completely broken down in the sense that the hydrolysis product has a negligible intrinsic viscosity and large quantities of sebacic acid and hydrazine are set free.

Having described our invention, what we desire to secure by Letters Patent is:

1. Process for the production of nitrogen-containing polymers resistant to acid hydrolysis, which comprises heating a reaction mixture, which reaction mixture contains monomeric reagents which yield on complete hydrolysis a dicarboxylic acid free from reactive groups other than the carboxy groups and two moles of hydrazine for each mole of dicarboxylic acid, in presence of water and in a pressure vessel closed throughout the operation until an acid-resistant polymer is produced.

2. Process for the production of nitrogen-containing polymers, resistant to acid hydrolysis, which comprises heating a reaction mixture, which reaction mixture contains monomeric reagents which yield on complete hydrolysis a dicarboxylic acid free from reactive groups other than the carboxy groups and two moles of hydrazine for each mole of dicarboxylic acid, in presence of water and in a pressure vessel closed throughout the operation until an acid-resistant polymer which is fiber-forming is produced.

3. Process for the production of nitrogen-containing polymers resistant to acid hydrolysis, which comprises heating a reaction mixture, which reaction mixture contains monomeric reagents which yield on complete hydrolysis a polymethylene dicarboxylic acid and two moles of hydrazine for each mole of dicarboxylic acid, in presence of water and in a pressure vessel closed throughout the operation until an acid-resistant polymer which is fiber-forming is produced.

4. Process for the production of nitrogen-containing polymers resistant to acid hydrolysis, which comprises heating a reaction mixture, which reaction mixture contains monomeric reagents which yield on complete hydrolysis sebacic acid and two moles of hydrazine for each mole of sebacic acid, in presence of water and in a pressure vessel closed through the operation until an acid-resistant polymer which is fiber-forming is produced.

JAMES WOTHERSPOON FISHER.
HAROLD BATES.
EDWARD WILLIAM WHEATLEY.

References Cited in the file of this patent

UNITED STATES PATENTS

| Number | Name | Date |
| --- | --- | --- |
| 2,476,968 | Fisher et al. | July 26, 1949 |
| 2,512,601 | Bates et al. | June 27, 1950 |
| 2,512,624 | Fisher et al. | June 27, 1950 |
| 2,512,631 | Fisher et al. | June 27, 1950 |

FOREIGN PATENTS

| Number | Country | Date |
| --- | --- | --- |
| 870,259 | France | Mar. 6, 1942 |